United States Patent Office 3,833,644
Patented Sept. 3, 1974

3,833,644
B,D-SECO-$\Delta^4$ AND $\Delta^{5(10)}$-STEROIDAL COMPOUNDS
Pierre Crabbé, Mexico City, Mexico, and John H. Fried, Palo Alto, Calif., assignors to Syntex Corporation, Panama, Panama
No Drawing. Filed July 20, 1971, Ser. No. 164,459
Int. Cl. C07c 171/07
U.S. Cl. 260—488 R  19 Claims

ABSTRACT OF THE DISCLOSURE

New 5,6;16,17-diseco- and 5,6;15,17-diseco - 16 - nor steroidal compounds of the estrane series, unsaturated at C–4,5 or C–5(10) useful as antiandrogenic agents, and methods for their preparation.

The present invention relates to novel B,D-diseco steroidal compounds and processes and intermediates useful for the synthesis thereof.

More particularly, this invention relates to certain novel 5,6;16,17-diseco and 5,6;15,17-diseco - 16 - nor - steroidal compounds of the estrane series, represented by the following formulas:

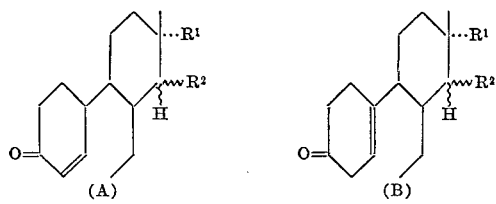

wherein $R^1$ represents carboxy and the conventionally hydrolyzable esters thereof, acetyl, lower alkyl or a hydroxylated hydrocarbon radical represented by the formulas:

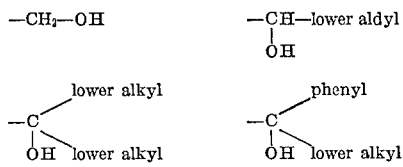

and the corresponding conventionally hydrolyzable esters and ethers thereof, and
$R^2$ represents methyl or ethyl.

These compounds have asymmetric carbon atoms at one or several positions (C–8,9,13 and/or 14) and the various stereoisomers are included within the scope of this invention.

The term "lower alkyl" as used herein refers to straight or branched alkyl groups containing up to 4 carbon atoms, e.g. methyl, ethyl, n-propyl, ispropyl, n-butyl and the like.

The term "conventional hydrolyzable esters and ethers" as used herein refers to those esters and ether groups conventionally employed in the steroid art. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical ester groups include acetate, propionate, butyrate, trimethylacetate, valerate, methylethylacetate, caproate, t-butylacetate, 3 - methylpentanoate, enanthate, caprylate, trimethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]-octane - 1′ - carboxylate, adamantoate, and the like. Typical ether groups are methyl ether, ethyl ether, cyclopentyl ether, cyclohexyl ether, propyl ether, tetrahydropyran - 2′ - yl ether, tetrahydrofuran - 2′ - yl ether, 4′-methoxytetrahydropyran-4′-yl ether, propylether, and the like.

The compounds of the present invention are valuable pharmaceutical agents possessing anti-androgenic activity. They are of particular utility for the treatment of hyperandrogenic conditions such as acne, prostatic hypertrophy, hirsutism in the female, seborrheic dermatitis and the like.

The compounds of the present invention are obtained by a process illustrated by the following sequence of reactions:

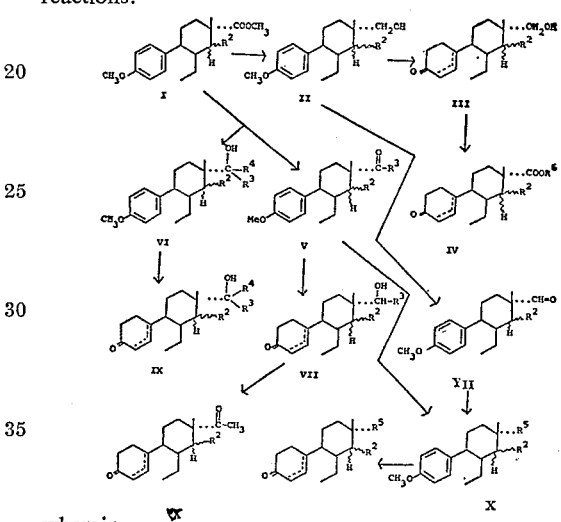

wherein $R^2$ has the above indicated meaning,
$R^3$ and $R^5$ represent a lower alkyl group,
$R^4$ represents a lower alkyl group or phenyl and
$R^6$ represents hydrogen or lower alkyl.

The dotted lines between positions C–4,5 and C–5(10) of the molecule indicate unsaturation in either of said positions.

The wavy lines for the hydrogen atom and the alkyl group at C–14 indicate the α or β configuration for said substitution or mixtures thereof.

In practicing the process illustrated above, a 3-methoxy-5,6;16,17 - disecoestra-1,3,5(10)-triene-17-oic acid methyl ester or the corresponding 5,6;15,17-diseco-16-nor-compound (I) is reduced with a double metal hydride, using particularly lithium aluminum hydride, to afford the corresponding 17-hydroxylated derivative (II), which is reduced with lithium in liquid ammonia to the 3-methoxy-2,5(10)-diene intermediate. Mild hydrolysis of the diene with a weak acid such as oxalic acid in aqueous methanolic solution, at room temperature, gives rise to 5,6;16, 17 - disecoestr - 5(10) - en-3-one or 5,6;15,17-diseco-16-norestr - 5(10)-en-3-one (III; double bond at C–5(10)). When the hydrolysis of the 2,5(10)-diene intermediate is carried out using a strong acid such as hydrochloric acid, either at room temperature or under refluxing conditions, the corresponding Δ⁴-3-keto compound is obtained, e.g. 5.6;16,17 - disecoestr - 4 - en - 17-ol-3-one (III; double bond at C–4). The 17-hydroxy compounds of formula III are converted into the corresponding acids (IV, $R^6$ = hydrogen) by oxidation with chromium trioxide, and the acids esterified by conventional methods, such as treatment with an excess of a diazoalkane e.g. diazomethane or diazoethane in ether solution, to yield the corresponding esters (IV; $R^6$=lower alkyl). The oxidation of the $\Delta^4$-3-keto compounds is effected using chromium trioxide in aqueous acetic acid, or acetone-sulfuric acid solution (Jones' reagent), whereas the oxidation of the $\Delta^{5(10)}$-3-keto isomers is preferably performed by reaction with chromium trioxide in pyridine, for a prolonged period of time.

By reaction of compound of formula (I) with from about equivalent amounts up to an excess of a lower alkylmagnesium halide such as methylmagnesium bromide, ethylmagnesium bromide, isopropylmagnesium bromide and the like in an inert organic solvent, at reflux temperature for a prolonged period of time of the order of 15 to 24 hours, the corresponding 3-methoxy-17-keto-17-alkyl-B,D-disecoestra-1,3,5(10)-triene compound (V) is produced, in mixture with the 3-methoxy-17-hydroxy-17-dialkyl compound (VI, $R^4$=lower alkyl).

When a 3 - methoxy-17-keto-17-alkyl-B,D-disecoestra-1,3,5(10)-triene compound (V) is treated with phenyl lithium in tetrahydrofuran solution or with phenylmagnesium bromide in ether solution, at reflux temperature, there is obtained the corresponding 3-methoxy-17-hydroxy-17 - alkyl - 17 - phenyl-5,6;16,17-disecoestra-1,3,5(10)-triene or 3 - methoxy - 17 - hydroxy-17-alkyl-17-phenyl-5,6;15,17 - diseco - 16-norestra-1,3,5(10)-triene derivative (VI, $R^4$=phenyl).

Reduction of the 17-keto compounds of formula V with an alkali metal such as lithium, sodium, or potassium in liquid ammonia followed by mild hydrolysis of the $\Delta^{2,5(10)}$-diene produced, i.e., using oxalic acid in aqueous methanol produces the corresponding 17-hydroxy-17-alkyl-5,6;16,17-disecoestr-5(10)en-3-one compounds or the 5,6;15,17-diseco-16-nor homolog thereof (VII, double bond at C–5(10)). When the hydrolysis of the diene intermediate is carried out with a strong mineral acid, e.g. with methanolic hydrochloric acid the corresponding 17-hydroxy-17-alkyl,B,D-disecoestr-4-en-3-one is produced (VII, double bond at C–4,5).

Similarly, by reduction of the 17-trisubstituted compounds of formula VI with an alkali metal in liquid ammonia followed by hydrolysis with either oxalic acid or hydrochloric acid the corresponding 17-hydroxy-17-dialkyl-$\Delta^{5(10)}$ and 17 - hydroxy-17-dialkyl-$\Delta^4$-3-keto-5,6;16,17-diseco-compounds, as well as the 17-hydroxy-17-alkyl-17-phenyl substituted derivatives and 5,6;15,17-diseco-16-nor homologs thereof (IX) are produced.

Oxidation of a compound of formula II with chromium trioxide under conventional conditions, and preferably using an 8N solution of chromic acid in acetone and in the presence of sulfuric acid (Jones' reagent) gives rise to the corresponding B,D-diseco-17-aldehyde compound (VIII), e.g. 3 - methoxy-5,6;16,17-disecoestra-1,3,5(10)-trien-17-al, which is then submitted to reduction of the aldehyde group by electrochemical methods to the corresponding 17-unsubstituted compound (X, $R^5$=methyl). This reduction is effected at the cathode of a divided electrolysis cell in an electrolytic medium comprising a mineral acid electrolyte, water and a water miscible inert organic solvent, at a current density of about 0.2 to about 0.8 amps/cm.$^2$ and at a temperature of from about 0° C. to about 70° C., for a period of about 1 to about 16 hours. Mineral acids suitable for the electrolytic medium are sulfuric acid, hydrochloric acid, perchloric acid, hydrobromic acid, phosphoric acid, and the like, preferably sulfuric acid or perchloric acid. Water-miscible organic solvents inert to the electrolysis reaction suitable for the electrolytic medium are ethers such as dioxane, tetrahydrofuran and the like, lower monohydric alcohols such as methanol, ethanol, and the like, lower alkylene glycols such as ethylene glycol, propylene glycol, and the like, mixtures of the foregoing solvents, and the like in which the aldehyde is soluble or substantially soluble.

The amount of solvent present in the electrolytic medium can range from that amount which is sufficient to dissolve or substantially dissolve the aldehyde up to about 94%, preferably from about 20% to about 85%, by weight, of the total electrolytic medium. The amount of acid in the medium can range from about 1% to about 20% by weight, of the total electrolytic medium, preferably from about 2% to about 15%. The amount of water in the medium should be at least 5%, by weight, of the total electrolytic medium, preferably from about 10% to about 75%. A preferred medium is an equal volume of an inert organic solvent and an equal volume of 10% to 30% aqueous sulfuric acid by weight.

Cathode materials useful in the process of the electrochemical reduction include the high hydrogen overvoltage materials such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficultly oxidizable conductors such as carbon, platinum, iron, lead, and the like. In general, the anode material may be any conductor which is not attacked by the electrolytic medium in a manner which could transform it into a soluble state over a short period.

Alternatively, the reduction can be carried out by chemical methods, for example, by treatment with benzyl mercaptan followed by desulfurization with Raney nickel. Other reduction conditions include the Wolff-Kishner reduction or Clemmenson reduction.

The 17-unsubstituted compound is then converted into 5,6;16,17 - disecoestr-5(10)-en-3-one,5,6;16,17-disecoestr-4-en-3-one or the corresponding 5,6;15,17-diseco-16-nor homologs thereof (XI, $R^5$=methyl) by the above described reduction and hydrolysis methods.

Similarly, electrochemical or chemical carbonyl reduction of a 3-methoxy-17-keto-17-alkyl-B,D-disecoestra-1,3,-5(10)-triene compound of formula V, e.g. 3-methoxy-17-keto - 17 - methyl-5,6;16,17-disecoestra-1,3,5(10)-triene produces the corresponding compounds substituted at C–17 by an alkyl group, compounds of formula X ($R^5$=alkyl of 2 to 4 carbon atoms) e.g. 3-methoxy-17-methyl - 5,6;16,17 - disecoestra-1,3,5(10)-triene, which in turn are reduced with an alkali metal in liquid ammonia, and the 2,5(10)-diene intermediate hydrolyzed with either oxalic acid or hydrochloric acid to afford the corresponding 17-alkyl-B,D-disecoestr-5(10)-en-3-one or 17-alkyl-B,D-disecoestr-4-en-3-one, e.g. 17-methyl-5,6;16,17-disecoestr-5(10)-en-3-one and 17-methyl-5,6;16,17-disecoestr-4-en-3 (XI, $R^5$=alkyl of 2 to 4 carbon atoms). Chemical carbonyl reduction of a compound of formula V can be accomplished by, for example, a Wolff-Kishner reduction, a Clemmensen reduction, or thioketal formation followed by treatment with Raney nickel, as described above.

Oxidation of compounds of formula VII ($R^3$=methyl) with chromium trioxide-pyridine gives rise to the corresponding 17-keto derivative (XII). Alternatively, the oxidation of $\Delta^4$-3-keto compounds can be effected using chromic acid in aqueous acetic acid solution or with Jones' reagent.

The compounds possessing hydroxyl groups (formulas II and VII and the $\Delta^4$ compounds of formula IX) can be esterified or etherified following the conventional esterification and etherification methods known to the skilled in the art, i.e., esterification with an acid anhydride or acid chloride in pyridine solution for the esterification of primary and secondary hydroxyl groups, and with carboxylic acid anhydrides in benzene solution and in the presence of an acid catalyst such as p-toluenesulfonic acid or with a mixture of a carboxylic acid-carboxylic anhydride in the presence of an acid catalyst, followed by mild acid or alkaline treatment for the $\Delta^4$-3-keto compounds having tertiary hydroxyl groups. The $\Delta^{5(10)}$ compounds of formula IX are esterified by a method comprising reduction of the keto function with a double metal hydride, diesterification with a mixture of carboxylic acid-carboxylic anhydride in the presence of an acid catalyst, selective saponification at C–3 with sodium carbonate and oxidation of the hydroxyl group with chromic acid in pyridine solution.

Etherification is also carried out by conventional techniques. Thus, reaction with dihydropyran, dihydrofuran or 4-methoxy-5,6-dihydro-2H-pyran in an inert solvent such as benzene and in the presence of an acid catalyst produces the tetrahydropyran-2'-yloxy, tetrahydrofuran-2'-yloxy or 4'-methoxytetrahydropyran-4'-yloxy derivatives, respectively. Methyl, ethyl and cyclopentyl ethers, for example, are prepared upon reaction of the hydroxy compound with sodium hydride and methyl iodide, ethyl iodide, and cyclopentyl bromide, respectively.

3 - methoxy - 5,6;16,17-disecoestra-1,3,5(10)-trien-17-oic acid methyl ester and its 14β-isomer used as starting materials (compounds of formula I, $R^2$=ethyl) can be obtained from p-methoxy butyrophenone, by a process illustrated by the following sequence of reactions:

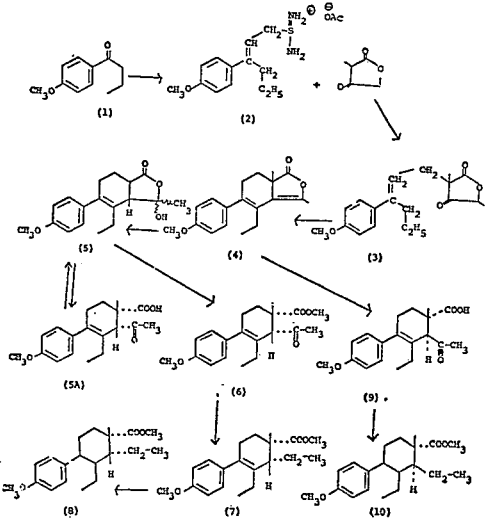

The method involves reaction of p-methoxybutyrophenone (1) which is commercially available, with vinyl magnesium bromide in ether, to give the vinyl carbinol, 4-(4'-methoxyphenyl)-4-hydroxyhex-5-ene, which is converted into its isothiouronium salt (2) by reaction with thiourea in acetic acid. This salt is condensed with α,γ-dimethyl tetronic acid, to yield [3- 4'-methoxyphenyl)-hex-2-enyl]-a,γ-dimethyl tetronic acid (3), which by acid-catalyzed cyclization in boiling xylene produces the enol lactone (4) namely 3 - methoxy-15-methyl-5,6-seco-16-oxaestra-1,3,5(10),8,14-pentan-17-one, and small amounts of the 14(α and β)-hydroxylated tetraene compounds. Alkaline treatment of the enol lactone with for example sodium hydroxide in methanol solution at room temperature for a period of time of the order of 1 to 3 hours followed by acidification provides the cis lactol (5), 3-methoxy-15-methyl-15ξ-hydroxy-5,6-seco-16-oxa-14β-estra - 1,3,5(10), 8-tetraen-17-one, in equilibrium with the keto acid (5A). Reaction of this lactol or the equilibrium mixture with methyl iodide produces the cis keto ester (6), which by electrochemical reduction of the keto group affords compound (7), 3 - methoxy-5,6;16,17-diseco-14β-estra-1,3,5-(10),8-tetraen-17-oic acid methyl ester. Catalytic reduction of the C–8 double bond produces 3-methoxy-5,6; 16,17-diseco-14β-estra-1,3,5(10)-trien-17-oic acid methyl ester (8).

When the alkaline treatment of the lactone (4) is conducted from a prolonged period of time, i.e. from about 16 hours, there is produced the trans keto acid (9) with a minor amount of the equilibrium mixture of the cis isomers (5) and (5A).

The trans keto acid (9) is then treated with methyl iodide and thereafter submitted to electrochemical carbonyl reduction, to thus give 3-methoxy-5,6;16,17-disecoestra-1,3,5(10),8-tetraen-17-oic acid methyl ester, which upon catalytic hydrogenation produces 3-methoxy-5,6;16, 17 - disecoestra-1,3,5(10)-trien-17-oic acid methyl ester (10).

3-methoxy - 5,6;15,17 - diseco-16-norestra-1,3,5(10)-trien-17-oic acid methyl ester (I, $R^2$=methyl) can be obtained from 1,2-dimethyl-3-ethyl-4-(p-anisyl) cyclohex-4-ene carboxylic acid, described for example by A. H. Nathan et al. in *J. Am. Chem. Soc. 78*, 6163 (1956), which is reduced selectively with lithium in liquid ammonia to the corresponding cyclohexane carboxylic acid and the acid esterified under conventional conditions, e.g. by reaction with diazomethane in ether solution.

The following examples illustrate but are not intended to limit the scope of the present invention.

PREPARATION 1

(A) A freshly prepared solution of 24 g. of vinyl bromide in 100 ml. of tetrahydrofuran is added to 4.0 g. of magnesium in 100 ml. of tetrahydrofuran to prepare a vinylmagnesium Grignard reagent. To this mixture is then added a solution of 24 g. of p-methoxybutyrophenone in 160 ml. of tetrahydrofuran and 10 ml. of ether, at —15° C. The resulting mixture is held at room temperature for a period of 24 hours, then heated at reflux for one hour and cooled. The reaction mixture is then poured into water, acidified with hydrochloric acid and stirred to decompose any excess Grignard reagent. The organic phase is then separated and the aqueous layer is extracted several times with ether. The combined ether phases are washed with water to neutrality, dried over sodium sulfate and evaporated, to yield 4-(4'-methoxyphenyl)-4-hydroxyhex-5-ene.

(B) A mixture of 11.8 g. of thiourea and 100 ml. of acetic acid is warmed on a steam bath until the mixture becomes homogeneous. The solution is then cooled to room temperature and to it is then added 1 molar equivalent of 4-(4'-methoxyphenyl)-4-hydroxyhex-5-ene. The resulting mixture is stirred until the mixture again becomes homogeneous. The acetic acid is then removed by heating (50–60° C.) under reduced pressure. The residue is poured with stirring into 70 ml. of ether. The resulting precipitate is collected and dried to yield 3-(4'-methoxyphenyl)-hex-2-enyl isothiouronium acetate.

(C) To a solution of 12.5 g. of 3-(4'-methoxyphenyl)-hex-2-enyl isothiouronium acetate in a mixture of 80 ml. of ethanol and 100 ml. of water, there is added a solution of 1 molar equivalent of α,γ-dimethyl tetronic acid in 20 ml. of ethanol. Immediately, the reaction mixture is diluted by adding an additional 80 ml. of water, stirred and allowed to stand at room temperature for a period of 24 hours. The reaction mixture is then heated at about 60° C. for 10 hours and then cooled to 5° C. for two hours, and the thus formed precipitate collected by filtration to yield α-[3-(4'-methoxyphenyl)-hex-2-enyl]-α',γ-dimethyl tetronic acid.

(D) To a solution of 1 g. of α-[3-(4'-methoxyphenyl)-hex-2-enyl]-α',γ-dimethyl tetronic acid in 200 ml. of xylene is added 270 mg. of p-toluenesulfonic acid. The resulting mixture is stirred under reflux temperature for 16 hours. The reaction mixture is cooled, and diluted with saturated sodium bicarbonate solution. The organic phase is separated and the aqueous layer extracted with ether. The organic extracts are combined, washed well with water, dried and evaporated. The residue is purified by TLC to give 3 - methoxy - 15-methyl-16-oxa-5,6-secoestra-1,3,5, (10),8,14-pentan-17-one, as well as 3-methoxy-14 (α and β) hydroxy - 15-methyl-16-oxa-5,6-secoestra-1,3,5(10),8-tetraen-17-one as by-products.

(E) A mixture of 984 mg. of 3-methoxy-15-methyl-16-oxa-5,6-secoestra-1,3,5(10),8,14 - pentaen - 17-one, 91.5 ml. of ethanol and 51.4 ml. of 1N aqueous sodium hydroxide solution is allowed to stand at room temperature for two hours. This reaction mixture is then acidified by the addition of 0.1N aqueous hydrochloric acid. The resulting acidic mixture is then extracted several times with ether. The ether extracts are combined, dried and evaporated under reduced pressure to give 3-methoxy - 15ξ-methyl-15ξ-hydroxy-5,6-seco-16-oxa-14β-estra - 1,3,5(10), 8-tetraen-17-one in equilibrium with the corresponding acid, 3-methoxy-15-keto-5,6;16,17-diseco-14β - estra-1,3,5 (10),8-tetraen-17-oic acid.

(F) A mixture of 686 mg. of 3-methoxy-15ξ-methyl-15ξ-hydroxy-5,6-seco - 16-oxa - 14β - estra - 1,3,5(10),8-tetraen-17-one, 343 mg. of sodium carbonate, 13 ml. of methyl iodide and 37 ml. of dimethylacetamide is stirred in the dark for sixteen hours. Then, excess methyl iodide is removed by evaporation under reduced pressure. The reaction mixture is then poured into water and the mixture extracted several times with ether. The ether extracts are combined, washed with water and then dilute aqueous sodium thiosulfate solution, dried and evaporated to furnish the methyl ester of 3-methoxy-15-keto-5,6;16,17-diseco-14β-estra-1,3,5(10),8-tetraen-17-oic acid.

(G) Into the cathode compartment of a divided electrolysis cell provided with a cellulose dialysis membrane, lead electrodes (each electrode measuring 2 cm. x 5 cm. x 1.6 mm.) and a stirrer, there is added 20 mg. of the methyl ester of 3-methoxy-15-keto-5,6;16,17-diseco-14β-estra-1,3,5(10),8-tetraen-17-oic acid and a mixture of 15 ml. of dioxane and 15 ml. of 10% aqueous sulfuric acid (by weight). An additional amount of a mixture of 15 ml. of dioxane and 15 ml. of 10% aqueous sulfuric acid is added to the cell. A current density of 0.02 amps./cm.$^2$ is applied for a period of five hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of 3-methoxy-5,6;16,17-diseco-14β-estra-1,3, 5(10),8-tetraen-17-oic acid, which is purified by TLC.

(H) A suspension of 0.3 g. of 5% palladium-on-carbon catalyst in 50 ml. of methanol is hydrogenated for 30 minutes. A solution of 2 g. of 3-methoxy-5,6;16,17-diseco-14β-estra-1,3,5(10),8-tetraen-17-oic acid methyl ester in 150 ml. of methanol is added and hydrogenated with agitation until the uptake of hydrogen ceases. The catalyst is removed by filtration and the filtrate evaporated to yield 3-methoxy-5,6 16,17-diseco-14β-estra-1,3,5(10)-trien - 17-oic acid methyl ester.

PREPARATION 2

A solution of 2.2 g. of 3-methoxy-15-methyl-16-oxa-5,6-secoestra-1,3,5(10),8,14-pentaen - 17 - one in 200 ml. of ethanol is treated with 83 ml. of 1N sodium hydroxide solution, and the reaction mixture is stirred at room temperature for 16 hours. It is then acidified with dilute hydrochloric acid solution and the product extracted with ethyl acetate. The organic extract is dried over sodium sulfate and evaporated to dryness under vacuo. The residue is purified by chromatography on silica gel preparative fluorescent chromatoplates to yield 3-methoxy-15-keto-5,6; 16,17-disecoestra-1,3,5(10),8-tetraen - 17 - oic acid and a small amount of 3-methoxy-15ξ-methyl-15ξ - hydroxy-5,6-seco-16-oxa-14β-estra-1,3,5(10),8-tetraen-17-one.

The *trans* keto acid thus obtained is submitted to the reactions described in parts F, G, and H of Preparation 1, to produce successively 3-methoxy-15-keto-5,6;16,17-disecoestra-1,3,5(10),8-tetraen-17-oic acid methyl ester, 3-methoxy-5,6;16,17-disecoestra-1,3,5(10),8-tetraen-17 - oic acid methyl ester and 3-methoxy-5,6;16,17-disecoestra-1,3, 5(10)-trien-17-oic acid methyl ester.

PREPARATION 3

A solution of 2 g. of 1,2-dimethyl-3-ethyl-4-(p-anisyl)-cyclohex-4-ene-carboxylic acid in 200 ml. of anhydrous tetrahydrofuran is added in a steady stream, under stirring, to a solution of 0.6 g. of lithium in 200 ml. of liquid ammonia. The resulting mixture is stirred for 30 minutes, methanol is then added dropwise until the blue color is discharged and the ammonia is allowed to evaporate. The mixture is acidified with 5% hydrochloric acid solution and extracted with methylene chloride. The combined organic extracts are washed with water to neutral, dried over sodium sulfate and evaporated to dryness under reduced pressure. The residue is purified by TLC to yield 1,2-dimethyl-3-ethyl-4-(p-anisyl) cyclohexane carboxylic acid, which can also be designated as 3-methoxy-5,6;15,17-diseco-16-norestra-1,3,5(10)-trien-17-oic acid.

A solution of 1 g. of the foregoing acid in 25 ml. of ether is treated with an excess of an ethereal solution of diazomethane, and the mixture is kept at room temperature for 2 hours; a few drops of acetic acid are added to destroy the excess diazomethane, and the mixture is then evaporated to dryness under reduced pressure to yield 3-methoxy-5,6;15, 17-diseco-16-norestra-1,3,5(10)-trien - 17-oic acid methyl ester.

Example 1

A solution of 18 g. of 3-methoxy-5,6;16,17-disecoestra-1,3,5(10)-trien-17-oic methyl ester in 200 ml. of anhydrous tetrahydrofuran is added dropwise under stirring, to 18 g. of lithium aluminum hydride in 300 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resulting mixture is filtered through Celite diatomaceous earth, and the filtrate extracted several times with methylene chloride; the combined organic extracts are washed to neutral, dried over sodium sulfate and evaporated to dryness. Chromatography of the residue on silica gel, using hexane-ethyl acetate (60:40) as eluant affords 3-methoxy-5,6;16,17-disecoestra-1,3,5(10)-trien-17-ol.

In a similar manner, starting from 3-methoxy-5,6;16,17-diseco-14β-estra-1,3,5(10)-trien-17-oic acid methyl ester and 3 - methoxy - 5,6;15,17-diseco-16-norestra-1,3,5(10)-trien-17-oic acid methyl ester there are obtained 3-methoxy-5,6;16,17-diseco-14β-estra-1,3,5(10)-trien-17-ol and 3-methoxy-5,6;15,17-diseco-16-norestra-1,3,5(10) - trien-17-ol, respectively.

Example 2

A solution of 16.5 g. of 3-methoxy-5,6;16,17-disecoestra-1,3,5(10)-trien-17-ol in 500 ml. of anhydrous tetrahydrofuran is added in a steady stream to 1.5 liters of liquid ammonia. To the resulting stirred solution are added 16.5 g. of lithium in portions, and the resulting blue solution is stirred for 1 hour further. Methanol is then added dropwise until the blue color is discharged and the amonia is allowed to evaporate. The product is then extracted with ethyl acetate and the combined organic extracts washed with water to neutral, dried over sodium sulfate and evaporated to dryness under reduced pressure, to give the oily 3-methoxy-5,6;16,17-disecoestra-2,5(10)-dien-17-ol.

A mixture of 15 g. of 3-methoxy-5,6;16,17-disecoestra-2,5(10)-dien-17-ol, 320 ml. of tetrahydrofuran, 350 ml. of methanol and 670 ml. of 6N hydrochloric acid is stirred at room temperature for 45 minutes. The reaction mixture is then poured into ice water and extracted with ethyl acetate. The organic extract is washed with water, sodium bicarbonate solution and water until neutral, dried over sodium sulfate and evaporated to dryness under vacuo. The residue is purified by TLC to give the pure 5,6;16,17-disecoestr-4-en-17-ol-3-one.

In like manner, 3-methoxy-5,6;16,17-diseco-14β-estra-1,3,5(10)-trien-17-ol and 3-methoxy-5,6-15,17-diseco-16-norestra-1,3,5(10)-trien-17-ol are converted successively into 3 - methoxy-5,6;16,17-diseco-14β-estra-2,5(10)-dien-17-ol and 5,6;16,17-diseco-14β-estr-4-en-17-ol-3-one, and 3-methoxy-5,6-15,17diseco - 16-norestra - 2,5(10)-dien- 17-ol and 5,6;15,17 - diseco-16-norestr-4-en-17-ol-3-one, respectively.

Example 3

A solution of 16 g. of 3-methoxy-5,6;16,17-disecoestra-1,3,5(10)-trien-17-oic acid methyl ester in 250 ml. of anhydrous tetrahydrofuran is treated with an excess (approximately 200 ml.) of 4N methylmagnesium bromide in ether and the mixture is refluxed with the exclusion of moisture for 18 hours. The cooled mixture is cautiously treated with excess aqueous ammonium chloride solution and the product isolated by extraction with methylene chloride. The extract is washed with water, dried over sodium sulfate and evaporated to dryness. The residue is purified by TLC using a mixture of hexane: ethyl acetate 95:5 to produce 3-methoxy-17-methyl-5,6; 16,17-disecoestra-1,3,5(10)-trien-17-one and 3-methoxy-17,17 - dimethyl - 5,6;16,17 - disecoestra-1,3,5(10)-trien-17-ol.

By the same method but using 3-methoxy-5,6;16,17-diseco-14$\beta$-estra-1,3,5(10)-trien-17-oic acid methyl ester and 3 - methoxy - 5,6;15,17-diseco-16-norestra-1,3,5(10)-trien-17-oic acid methyl ester as starting materials, there are obtained respectively 3-methoxy-17-methyl-5,6;16,17-diseco - 14$\beta$-estra-1,3,5(10)-trien-17-one and 3-methoxy-17,17 - dimethyl-5,6;16,17-seco-14$\beta$-estra-1,3,5(10)-trien-17-ol; and 3-methoxy-17-methyl-5,6;15,17-diseco-16-norestra-1,3,5(10)-trien-17-one and 3-methoxy-17,17-dimethyl-5,6;15,17-diseco-16-norestra-1,3,5(10)-trien-17-ol.

Example 4

A solution of 10 g. of 3-methoxy-5,6;16,17-disecoestra-1,3,5(10)-trien-17-ol in 200 ml. of acetone distilled over potassium hydroxide is cooled to 10° C. and treated under an atmosphere of nitrogen and with stirring, with a solution of 8N chromic acid (prepared by mixing 26 g. of chromium trioxide with 23 ml. of concentrated sulfuric acid and diluting with water to 100 ml.) until the color of the reagent persisted in the mixture. It is stirred for 10 minutes further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives 3-methoxy-5,6;16,17-disecoestra-1,3,5(10)-trien-17-al.

A mixture of 1 g. of 3-methoxy-5,6;16,17-disecoestra-1,3,5(10)-trien-17-al, 2 g. of hydrazine hydrate, 1.2 g. of potassium hydroxide, 1.2 ml. of water and 1.2 ml. of diethylene glycol is heated under reflux for 45 minutes. It is then heated in an open flask until the temperature of the reaction mixture reaches 200° C., a reflux condenser is attached, and refluxing is continued for 2 hours further. The solution is then cooled, water is added and the product isolated by extraction with ether. The combined organic extracts are washed with water to neutral, dried over sodium sulfate and evaporated to dryness under vacuo. The residue is dissolved in 20 ml. of acetone, 0.5 g. of p-toluenesulfonic acid is added, and the mixture is kept at room temperature for 6 hours. The reaction mixture is then diluted with water and extracted with methylene chloride and the organic extracts washed with water to neutral, dried over sodium sulfate and evaporated to dryness under reduced pressure. The residue is purified by TLC, to give the pure 3-methoxy-5,6;16,17-disecoestra-1,3,5(10)-triene.

Alternatively, the following procedure can be employed.

Into the cathode compartment of a divided electrolysis cell provided with a cellulose dialysis membrane, lead electrodes (each electrode measuring 2 cm. x 5 cm. x 1.6 mm.) and a stirrer, there is added 4.15 g. of 3-methoxy-5,6;16,17-disecoestra-1,3,5(10)-trien-17-al and a mixture of 600 ml. of dioxane and 500 ml. of 10% aqueous sulfuric acid (by weight). To the anode compartment is added 40 ml. of the mixture of dioxane and 10% aqueous sulfuric acid. A current density of 0.8 amps/cm.$^2$ is applied for a period of six hours. The reaction mixture is then removed from the cell and concentrated under reduced pressure to a small volume which is then extracted several times with ether. The ether extracts are combined, washed with water, and a 5% aqueous sodium bicarbonate solution, dried and evaporated to dryness to furnish 3-methoxy-5,6;16,17-diseco-estra-1,3,5(10)-triene.

The process of this example is repeated with the exception of using 3 - methoxy-5,6;16,17-diseco-14$\beta$-estra-1,3, 5(10)-trien-17-ol and 3-methoxy-5,6;15,17-diseco-16-norestra-1,3,5(10)-trien-17-ol as starting materials, to yield as final products 3 - methoxy-5,6;16,17-diseco-14$\beta$-estra-1,3, 5(10)-triene and 3-methoxy-5,6;15,17-diseco-16-norestra-1,3,5(10)-triene, respectively.

In accordance with the reduction set forth in this example, 3-methoxy - 17 - methyl-5,6;16,17-disecoestra-1,3, 5(10)-trien-17-one and 3 - methoxy-17-methyl-5,6;15,17-diseco-16-norestra-1,3,5(10)-trien-17 - one are converted into the corresponding desoxo compounds, namely, 3-methoxy-17-methyl-5,6;16,17-disecoestra-1,3,5(10)-triene and 3-methoxy-17-methyl - 5,6;15,17 - diseco-16-norestra-1,3,5(10)-triene.

The 17-desoxo compounds obtained in this example are in turn reduced with lithium ammonia, in accordance with the method of Example 2, and the 3-methoxy-$\Delta^{2,5(10)}$-intermediates hydrolyzed with hydrochloric acid, as established in said example, thus obtaining: 5,6;16,17-disecoestr-4-en-3-one, 5,6;16,17-diseco-14$\beta$-estr-4-en-3-one, 5,6; 15,17-diseco-16-norestr - 4-en-3-one, 17-methyl-5,6;16,17-disecoestr-4-en-3-one and 17 - methyl-5,6;15,17-diseco-16-norestr-4-en-3-one.

Example 5

A solution of 2 g. of 3-methoxy-17-methyl-5,6;16,17-disecoestra-1,3,5(10)-trien - 17 - one in 250 ml. of anhydrous tetrahydrofuran is added dropwise to a solution of 10 molar equivalents of phenyl lithium in 150 ml. of ether with mechanical stirring and under an atmosphere of nitrogen. The mixture is then refluxed for 5 hours, cooled, poured into ice water and acidified with hydrochloric acid, stirring vigorously for 1 hour. The product is then extracted with methylene chloride and the organic extracts washed with water to neutral, dried over sodium sulfate and evaporated to dryness. Recrystallization of the residue from acetone-hexane yields 3-methoxy-17-methyl-17-phenyl-5,6;16,17-disecoestra-1,3,5(10)-trien-17-ol.

In a similar manner, starting from 3-methoxy-17-methyl-5,6;16,17 - diseco-14$\beta$-estra - 1,3,5(10) - trien-17-one and 3-methoxy-17-methyl-5,6;15,17-diseco - 16 - norestra-1,3,5(10)-trien-17-one the corresponding 17-phenyl-17-hydroxy compounds are obtained, namely 3-methoxy-17-methyl-17-phenyl-5,6;16,17-diseco - 14$\beta$ - estra-1,3,5(10)-trien-17-ol and 3-methoxy-17-methyl - 17 - phenyl-5,6;15, 17-diseco-16-norestra-1,3,5(10)-trien-17-ol.

Upon reduction of 3-methoxy-17-methyl-17-phenyl-5,6; 16,17 - disecoestra-1,3,5(10)-trien-17-ol with lithium in liquid ammonia followed by hydrolysis of the $\Delta^{2,5(10)}$-diene intermediate with hydrochloric acid, in accordance with the methods of Example 2, 17-methyl-17-phenyl-5,6; 16,17-disecoestr-4-en-17-ol-3-one is obtained.

Similarly, 3 - methoxy-17-methyl-17-phenyl-5,6;16,17-diseco-14$\beta$-estra-1,3,5(10)-trien - 17 - ol and 3-methoxy-17-methyl - 17 - phenyl-5,6;15,17-diseco-16-norestra-1,3, 5(10)-trien-17-ol are converted respectively into 17-methyl-17-phenyl-5,6;16,17-diseco-14$\beta$-estr - 4 - en-17-ol-3-one and 17-methyl-17-phenyl-5,6;15,17-diseco - 16 - norestr-4-en-17-ol-3-one.

Example 6

A solution of 15 g. of 3-methoxy-5,6;16,17-disecoestra-2,5(10)-dien-17-ol in 1280 ml. of methanol is treated with 19.5 g. of oxalic acid dissolved in 250 ml. of water. The reaction mixture is kept at room temperature for 45 minutes, diluted with ice water and extracted with methylene chloride. The organic extracts are washed with sodium bicarbonate solution and water to neutrality, dried over sodium sulfate and evaporated to dryness under vacuo. Crystallization of the residue from acetone-hexane affords 5,6;16,17-disecoestr-5(10)-en-17-ol-3-one.

By the same method, the following compounds are obtained:

5,6;16,17-diseco-14β-estr-5(10)-en-17-ol-3-one,
5,6;15,17-diseco-16-norestr-5(10)-en-17-ol-3-one,
5,6;16,17-disecoestr-5(10)-en-3-one,
5,6;16,17diseco-14β-estr-5(10)-en-3-one,
5,6;15,17-diseco-16-norestr-5(10)-en-3-one,
17-methyl-5,6;16,17-disecoestr-5(10)-en-3-one,
17-methyl-5,6;16,17-diseco-14β-estr-5(10)-en-3-one and
17-methyl-17-phenyl-5,6;16,17-disecoestr-5(10)-en-17-ol-3-one.

Example 7

A mixture of 1.5 g. of 5,6;16,17-disecoestr-4-en-17-ol-3-one, 10 ml. of pyridine and 5 ml. of acetic anhydride is kept at room temperature for 18 hours. The mixture is then poured into ice water, and the formed precipitate collected by filtration, washed with water and dried. Crystallization from ether affords 17-acetoxy-5,6;16,17-disecoestr-4-en-3-one in pure form.

In like manner, using propionic, caproic, and cyclopentylpropionic anhydrides as esterifying agents in lieu of acetic anhydride the corresponding 17-propionoxy, 17-caproxy and 17-cyclopentylpropionoxy derivatives of 5,6;16,17-disecoestr-4-en-3-one are obtained. By the same method, 17-acetoxy-5,6;16,17-diseco-14β-estr-4-en-3-one is prepared. Also, 17 - acetoxy-5,6;16,17-disecoestr-5(10)-en-3-one and the 14β isomer thereof are prepared.

Example 8

To a cold solution of 1 g. of 5,6;16,17-disecoestr-4-en-17-ol-3-one in 40 ml. of pyridine is added 6 ml. of heptanoyl chloride and the reaction mixture is allowed to stand for 18 hours at room temperature. The reaction mixture is then concentrated to a small volume under vacuo, diluted with water and extracted with methylene chloride; the organic extracts are washed with water to neutrality, dried over sodium sulfate and evaporated to dryness under reduced presure. Crystallization of the residue from acetone-hexane gives 17-heptanoyloxy-5,6;16,17-disecoestr-4-en-3-one. By the same method, 5,6;16,17-diseco-14β-estr-4-en-17-ol-3-one is converted into the corresponding heptanoate. Also 17-heptanoyloxy-5,6;16,17-disecoestr-5(10)-en-3-one and the 14β isomer thereof are prepared.

Example 9

Two milliliters of dihydropyran are added to a solution of 1 g. of 5,6;16,17-disecoestr-4-en-17-ol-3-one in 15 ml. of benzene. About 1 ml. is distilled off to remove moisture and 0.4 g. of p-toluenesulfonyl chloride is added to the cooled solution. The mixture is allowed to stand at room temperature for four days, and is then washed with aqueous sodium carbonate solution and water, dried and evaporated. The residue is chromatographed on neutral alumina, eluting with hexane, to yield 17-tetrahydropyran-2'-yloxy-5,6;16,17-disecoestr - 4 - en-3-one which is recrystallized from pentane.

By employing the method of the preceding paragraph using dihydrofuran in lieu of dihydropyran, there is prepared the corresponding 17-tetrahydrofuran - 2' - yloxy-5,6;16,17-disecoestr-4-en-3-one product. Similarly, 17-(4'-methoxytetrahydropyran-4'-yloxy)-5,6;16,17 - disecoestr-4-en-3-one is prepared by utilization of the foregoing procedure employing 4-methoxy-5,6-dihydro - 2H - pyran in lieu of dihydropyran.

Example 10

A solution of one gram of 5,6;16,17-disecoestr-4-en-17-ol-3-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 17-cyclopentyloxy-5,6;16,17-disecoestr-4-en-3-one which is further purified upon recrystallization from pentane.

Alternatively, methyl iodide and ethyl iodide can be used in lieu of cyclopentyl bromide to produce 17-methoxy-5,6;16,17-disecoestr-4-en - 3 - one and 17-ethoxy-5,6;16,17-disecoestr-4-en-3-one respectively.

Likewise, the 17-cyclopentyl, methyl and ethyl ethers of 5,6;15,17-diseco-16-norestr - 4 - en-17-ol-3-one are obtained.

Example 11

In accordance with the method of Example 2, 5 g. of 3 - methoxy - 17,17 - dimethyl 5,5;16,17 disecoestra-1,3,5(10)-trien-17-ol is reduced with lithium in liquid ammonia, and the 3-methoxy-17,17-dimethyl-5,6;16,17-disecoestra-2,5(10)-dien-17-ol hydrolyzed with hydrochloric acid or oxalic acid to give 17,17-dimethyl-17-hydroxy-5,6;16,17-disecoestr-4-en-3-one and 17,17-dimethyl-17-hydroxy-5,6;16,17-disecoestr-5(10)-en-3-one respectively.

A mixture of 1 g. of 17,17-dimethyl - 17 - hydroxy-5,6;16,17-disecoestr-4-en-3-one, 2 ml. of acetic anhydride, 5 ml. of acetic acid and 1 g. of p-toluenesulfonic acid is kept at room temperature for 2 hours. The reaction mixture is then diluted with water, extracted with methylene chloride and the organic extracts washed with water, sodium carbonate solution and water to neutrality, dried over sodium sulfate and evaporated to dryness under vacuo. The residue is dissolved in 100 ml. of methanol containing 1 ml. of 5% hydrochloric acid and boiled for 10 minutes. The reaction mixture is neutralized with sodium carbonate and evaporated to a small volume, diluted with water and extracted with methylene chloride. The organic extract is washed with water, dried and evaporated to dryness. Crystallization of the residue from acetone-ether gives 17,17-dimethyl-17-acetoxy-5,6;16,17-disecoestr-4-en-3-one.

By using propionic anhydride and enanthic anhydride in place of acetic anhydride the corresponding propionate and enanthate of 17,17-dimethyl-17-hydroxy-5,6;16,17-disecoestr-4-en-3-one are obtained.

Example 12

A solution of 4 g. of 3-methoxy-17-methyl-17-keto-5,6;16,17-disecoestra-1,3,5(10)-triene in 100 ml. of anhydrous tetrahydrofuran is added in a steady stream under vigorous stirring to 1 l. of liquid ammonia. An additional amount of tetrahydrofuran is added until the mixture becomes clear, and then 4 g. of lithium wire in small portions are added in a 30 minute period and under stirring. The reaction mixture is stirred for 2 hours further and the blue color discharged by careful addition of methanol. The colorless mixture is allowed to stand at room temperature for several hours to evaporate the ammonia and then extracted with ethyl acetate. The organic extracts are washed with water to neutral, dried over sodium sulfate and evaporated to dryness under reduced pressure to give 3-methoxy-17-methyl-17-hydroxy-5,6;16,17-disecoestra-2,5(10)-diene.

The foregoing crude compound is dissolved in 320 ml. of methanol and treated with a solution of 4.8 g. of oxalic acid in 62 ml. of water. The reaction mixture is kept at room temperature for 45 minutes, water is then added and the product extracted with methylene chloride. The combined extracts are washed with water, 5% sodium bicarbonate solution and water to neutrality, dried over sodium sulfate and evaporated to dryness, to yield 17-methyl-17-hydroxy-5,6;16,17-disecoestr-5(10)-en-3 - one, which may be purified by recrystallization from acetone-hexane.

A solution of 1 g. of 17-methyl-17-hydroxy-5,6;16,17-disecoestr-5(10)-en-3-one in 20 ml. of pyridine is added to a mixture of 1 g. of chromium trioxide and 20 ml. of pyridine. The reaction mixture is allowed to stand at room temperature for 18 hours, and then diluted with ethyl acetate and filtered through Celite, diatomaceous earth, washing the solid with hot ethyl acetate. The combined filtrates are washed well with water, dried over sodium sulfate and evaporated to dryness, thus producing 17 - methyl - 5,6;16,17 - disecoestr-5(10)-ene-3,17-dione which is purified by crystallization from acetone-ether.

In a similar manner, starting from 3-methoxy-17-methyl-17-keto-5,6;16,17 - diseco - 14β-estra - 1,3,5(10)-triene there are obtained successively: 3-methoxy-17-methyl-17-hydroxy-5,6;16,17-diseco - 14β - estra-2,5(10)-diene, 17-methyl - 17 - hydroxy-5,6;16,17-diseco-14β-estr-5(10)-en-3-one and 17-methyl-5,6;16,17-diseco-14β-estr-5(10)-ene-3,17-dione.

Example 13

In accordance with the hydrolysis method of Example 2, 1 g. of 3-methoxy-17-methyl-17-hydroxy-5,6;16,17-disecoestr - 2,5(10) - diene is converted into 17-methyl-5,6;16,17-disecoestr-4-en-17-ol - 3 - one, which is oxidized with chromium trioxide in pyridine, by following the method of the preceding example, to yield 17-methyl-5,6;16,17-disecoestr-4-ene-3,17-dione.

Alternatively, the oxidation of the 17-hydroxyl group can be carried out using an 8N chromic acid solution (Jones reagent), in accordance with the oxidation method of Example 4.

Example 14

By following the method of Example 7, 17-methyl-17-hydroxy - 5,6;16,17-disecoestr-5(10)-en-3-one, 17-methyl-17 - hydroxy-5,6;16,17-diseco-14β-estr-5(10)-en-3-one and 17-methyl-17-hydroxyl-5,6;15,17 - diseco-16-norestr-4-en-3-one are converted into the corresponding acetates, propionates, caproates and cyclopentylpropionates.

Example 15

The method of Example 3 is repeated with the exception of using ethereal ethylmagnesium bromide and n-propylmagnesium bromide as reagents instead of methylmagnesium bromide, to produce 3-methoxy-17-ethyl-5,6;16,17 - disecoestra - 1,3,5(10) - trien - 17 - one and 3-methoxy-17,17-diethyl - 5,6;16,17 - disecoestra-1,3,5(10)-trien-17-ol, and 3-methoxy - 17 - propyl - 5,6;16,17-disecoestra-1,3,5(10)-trien-17-one and 3-methoxy-17,17-dipropyl-5,6;16,17-disecoestra-1,3,5(10)-trien-17-ol, respectively.

Example 16

Example 12 is repeated using 3-methoxy-5,6;15,17-diseco-16-norestra - 1,3,5(10) - trien - 17 - one as starting material, thus producing succesisvely: 3-methoxy-17-hydroxy-5,6;15,17-diseco - 16 - norestra - 2,5(10) - diene, 17 - hydroxy - 5,6;15,17 - diseco - 16 - norestr - 5(10)-en-3 - one and 5,6;15,17 - diseco - 16 - norestr - 5(10)-ene-3,17-dione.

Example 17

A solution of 5 g. of sodium borohydride in 15 ml. of water is added to an ice-cold solution of 5 g. of 17-methyl-17 - phenyl - 5,6;16,17 - disecoestr - 5(10)-en-17-ol-3-one in 250 ml. of methanol, and the reaction mixture is allowed to stand at room temperature for 16 hours. The excess reagent is decomposed by adding 2.5 ml. of acetic acid, the solution is concentrated to a small volume and diluted with water. The product is isolated by extraction with ethyl acetate and the organic extract is washed with water, dried and evaporated to dryness, thus affording 17-methyl-17-phenyl-5,6;16,17 - disecoestr - 5(10)-ene-3,17-diol.

A mixture of 2 g. of 17-methyl-17-phenyl-5,6;16,17-disecoestr-5(10)-ene-3,17-diol, 75 ml. of benzene, 10 ml. of acetic anhydride and 0.5 g. of p-toluenesulfonic acid is maintained at room temperature for 2 hours. It is then diluted with water and the organic phase separated, washed with water, sodium carbonate solution and water to neutral, dried and evaporated to dryness under vacuo to yield 3,17 - diacetoxy - 17 - methyl - 17 - phenyl - 5,6; 16,17-disecoestr-5(10)-ene.

To a solution of 2 g. of 3,17-diacetoxy-17-methyl-17-phenyl - 5,6;16,17 - disecoestr - 5(10)-ene in 100 ml. of methanol is added a solution of 1 g. of potassium carbonate dissolved in 10 ml. of water, and the mixture is refluxed for 1 hour. The reaction mixture is then poured into water and extracted with methylene chloride, the organic extracts are washed with water to neutral, dried and evaporated to dryness under vacuo, to produce 17-acetoxy-17-methyl - 17 - phenyl - 5,6;16,17 - disecoestr-5(10)-en-3-ol.

Oxidation of the foregoing compound with chromium trioxide-pyridine, in accordance with the method of Example 12, affords 17-acetoxy - 17 - methyl - 17 - phenyl-5,6;16,17-disecoestr-5(10)-en-3-one.

By the same method 17,17 - dimethyl - 5,6;16,17-disecoestr-5(10) - en - 17 - ol - 3 one is converted into the corresponding acetate.

In a similar fashion but using other carboxylic acid anhydrides in place of acetic anhydride, e.g. propionic anhydride, valeric anhydride and caproic anhydride, there are produced the corresponding esters of 17-methyl-17-phenyl-5,6;16,17-disecoestr-5(10) - en - 17-ol-3-one and 17,17-dimethyl-5,6;16,17 - disecoestr - 5(10) - en-17-ol-3-one as final products.

Example 18

A solution of 10 g. of 5,6;16,17-disecoestr-4-en-17-ol-3-one in 200 ml. of acetone distilled over potassium hydroxide is cooled to 10° C. and treated under an atmosphere of nitrogen and with stirring, with a solution of 8N chromic acid (prepared by mixing 26 g. of chromium trioxide with 23 ml. of concentrated sulfuric acid and diluting with water to 100 ml.), until the color of the reagent persisted in the mixture. It is stirred for 3 hours further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives 3-keto-5,6;16,17-disecoestr-4-en-17-oic acid.

To a solution of 1 g. of 3-keto-5,6;16,17-disecoestr-4-en-17-oic acid in 20 ml. of ether is added 20 ml. of an ethereal solution of diazomethane, and the mixture is kept at room temperature for 1 hour. The excess diazomethane is then destroyed by adding a few drops of acetic acid, and the solvent eliminated under vacuo, thus obtaining 3-keto-5,6;16,17-disecoestr-4-en-17-oic acid methyl ester.

By the same methods, 5,6;16,17-diseco-14β-estr-4-en-17-ol-3-one, and 5,6;15,17-diseco-16-norestr-4-en-17-ol-3-one are converted first into the corresponding acids, and then into the methyl esters.

When using diazoethane in lieu of diamomethane, the ethyl esters are obtained.

Also, 3-keto-5,6;16,17-disecoestr-5(10)-en-17-oic acid and the 14β-isomer thereof are prepared.

What is claimed is:

1. A compound selected from the group of compounds represented by the formulas:

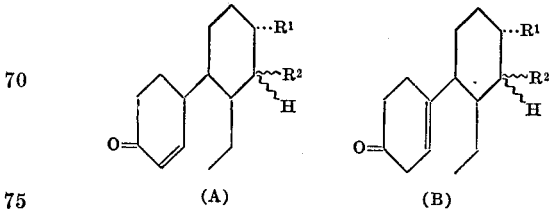

(A)  (B)

wherein,

R¹ is a hydroxylated hydrocarbon radical represented by the formulas:

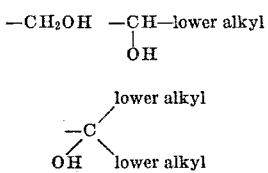

and the hydrolyzable hydrocarbon carboxylic acid esters thereof wherein the carboxylic acid moiety has from 1 to 12 carbon atoms; and
R² is methyl or ethyl.

2. A compound according to Claim 1 wherein R² is ethyl.

3. A compound according to Claim 2 wherein R¹ is hydroxymethyl and the hydrolyzable esters thereof.

4. A compound according to Claim 2 wherein R¹ is the group

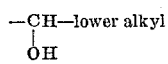

and the hydrolyzable esters thereof.

5. A compound according to Claim 2 wherein R¹ is the group

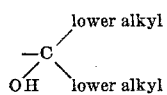

and the hydrolyzable esters thereof.

6. A compound according to Claim 1 wherein the hydrogen atom at C–14 is in the α-configuration and R² is ethyl.

7. A compound according to Claim 6, formula A, wherein R¹ is hydroxymethyl; 17-hydroxy-5,6; 16,17-disecoestr-4-en-3-one.

8. A compound according to Claim 6, formula A, wherein R¹ is acetoxymethyl; 17-acetoxy-5,6; 16,17-disecoestr-4-en-3-one.

9. A compound according to Claim 6, formula A, wherein R¹ is heptanoyloxymethyl; 17-heptanoyloxy-5,6; 16,17-disecoestr-4-en-3-one.

10. A compound according to Claim 6, formula B, wherein R¹ is hydroxymethyl; 17-hydroxy-5,6; 16,17-disecoestr-4-en-3-one.

11. A compound according to Claim 6, formula B, wherein R¹ is acetoxymethyl; 17-acetoxy-5,6; 16,17-disecoestr-5(10)-en-3-one.

12. A compound according to Claim 6, formula B, wherein R¹ is heptanoyloxymethyl; 17-heptanoyloxy-5,6; 16,17-disecoestr-5(10)-en-3-one.

13. A compound according to Claim 1, wherein the hydrogen atom at C–14 is in the β-configuration and R² is ethyl.

14. A compound according to Claim 13, formula A, wherein R¹ is hydroxymethyl; 17-hydroxy-5,6; 16,17-diseco-14β-estr-4-en-3-one.

15. A compound according to Claim 13, formula A, wherein R¹ is acetoxymethyl; 17-acetoxy-5,6; 16,17-diseco-14β-estr-4-en-3-one.

16. A compound according to Claim 13, formula A, wherein R¹ is heptanoyloxymethyl; 17-heptanoyloxy-5,6; 16,17-diseco-14β-estr-4-en-3-one.

17. A compound according to Claim 13, formula B, wherein R¹ is hydroxymethyl; 17-hydroxy-5,6; 16,17-diseco-14β-estr-5(10)-en-3-one.

18. A compound according to Claim 13, formula B, wherein R¹ is acetoxymethyl; 17-acetoxy-5,6; 16,17-diseco-14β-estr-5(10)-en-3-one.

19. A compound according to Claim 13, formula B, wherein R¹ is heptanoyloxymethyl; 17-heptanoyloxy-5,6; 16,17-diseco-14β-estr-5(10)-en-3-one.

References Cited

UNITED STATES PATENTS

| | | | |
|---|---|---|---|
| 3,636,072 | 1/1972 | Cross et al. | 260—476 C |
| 3,716,578 | 2/1973 | Johnk | 260—488 CD |
| 2,806,039 | 9/1957 | Murray | 260—476 C |
| 3,704,324 | 11/1972 | Uskokovic | 260—476 C |

VIVIAN GARNER, Primary Examiner

U.S. Cl. X.R.

260—343.3, 343.6, 345.9, 347.8, 404, 408, 410, 468 G, 468 R, 471 R, 473 R, 476 R, 482 R, 484 A, 489 R, 486 R, 487, 488 CD, 514 G, 520, 541, 586 H, 590, 600, 611 R, 612 D, 612 R, 613 R, 999

UNITED STATES PATENT OFFICE
CERTIFICATE OF CORRECTION

Patent No. 3,833,644     Dated September 3, 1974

Inventor(s) PIERRE CRABBE et al

It is certified that error appears in the above-identified patent and that said Letters Patent are hereby corrected as shown below:

Column 1, line 56, change "esters" to --ester--.

Column 2, line 33, change "VII" to --VIII--.

Column 2, line 38, below the left formula, change "X" to --XII--.

Column 2, line 39, insert --XI-- under center formula.

Column 4, line 49, change "estr-4-en-3" to --estr-4-en-3-one--.

Column 5, line 58, change "-15-" to -- -15§- --.

Column 8, line 53, change "amonia" to --ammonia--.

Signed and sealed this 6th day of May 1975.

(SEAL)
Attest:

RUTH C. MASON
Attesting Officer

C. MARSHALL DANN
Commissioner of Patents
and Trademarks